E. G. EBERHARDT.
MECHANICAL MOVEMENT.
APPLICATION FILED FEB. 17, 1908.

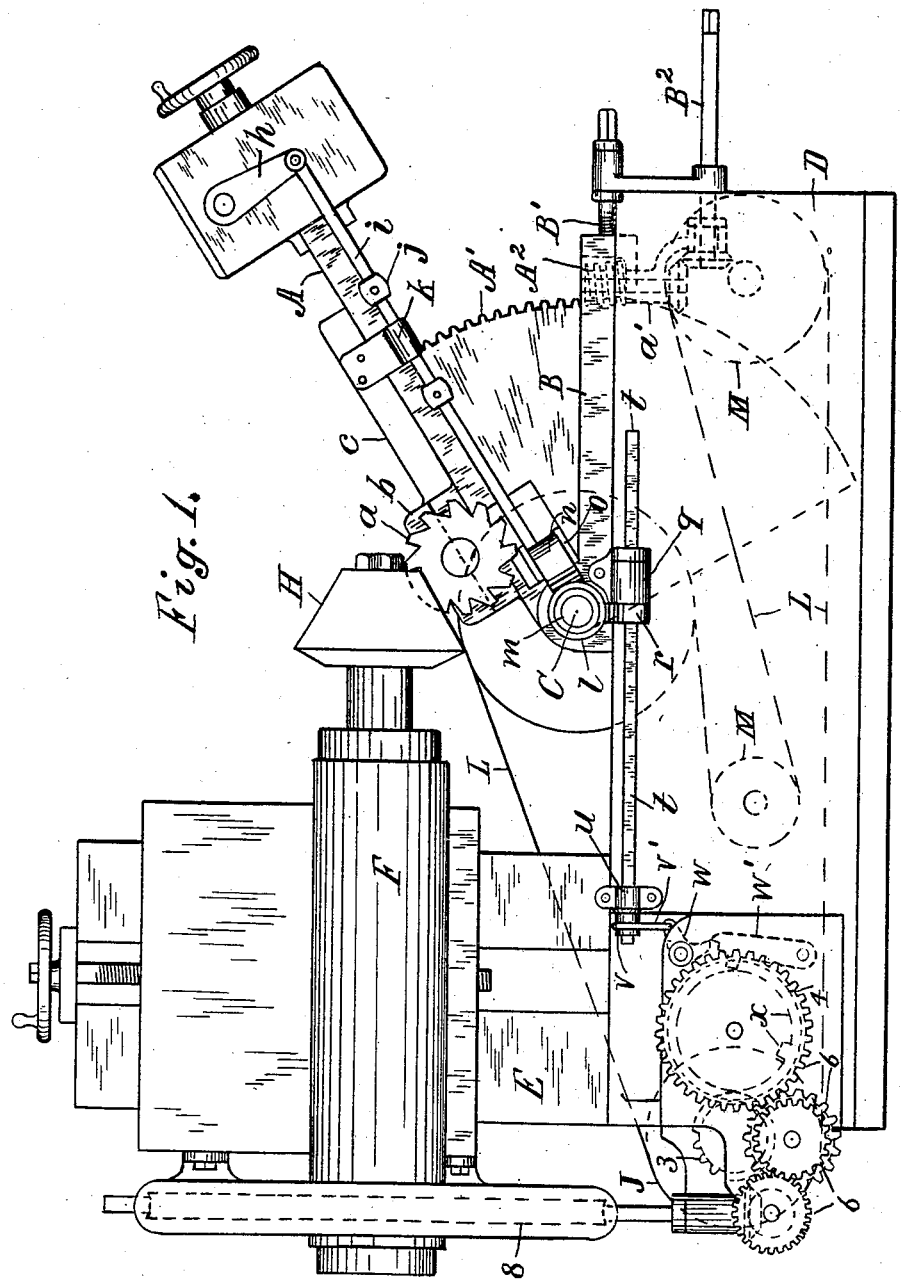

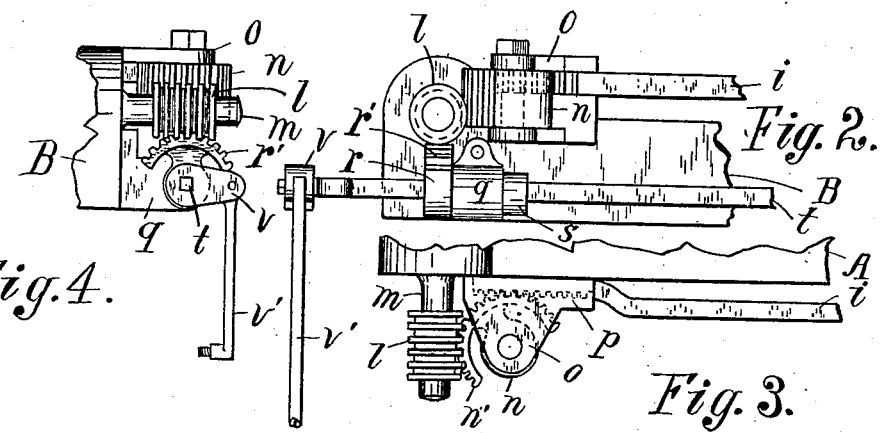
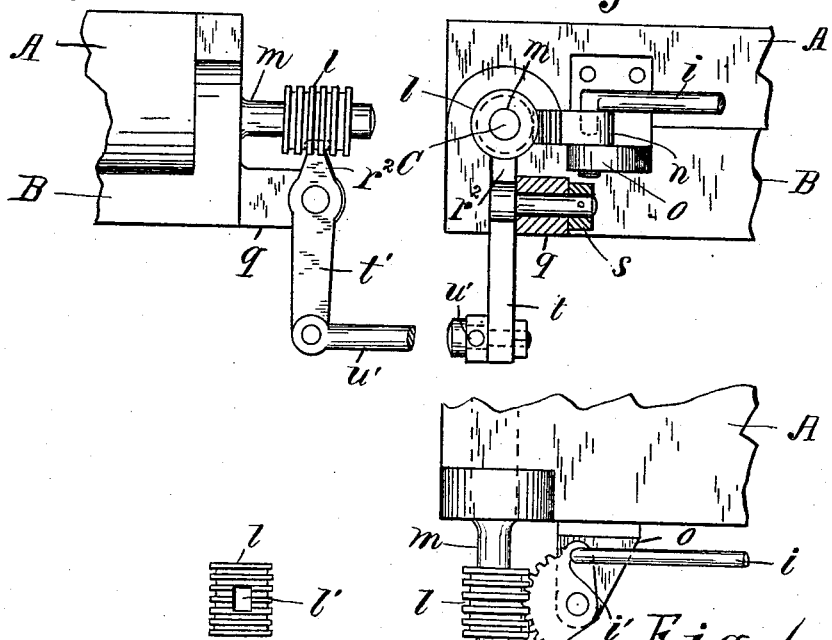

969,352.

Patented Sept. 6, 1910.
4 SHEETS—SHEET 3.

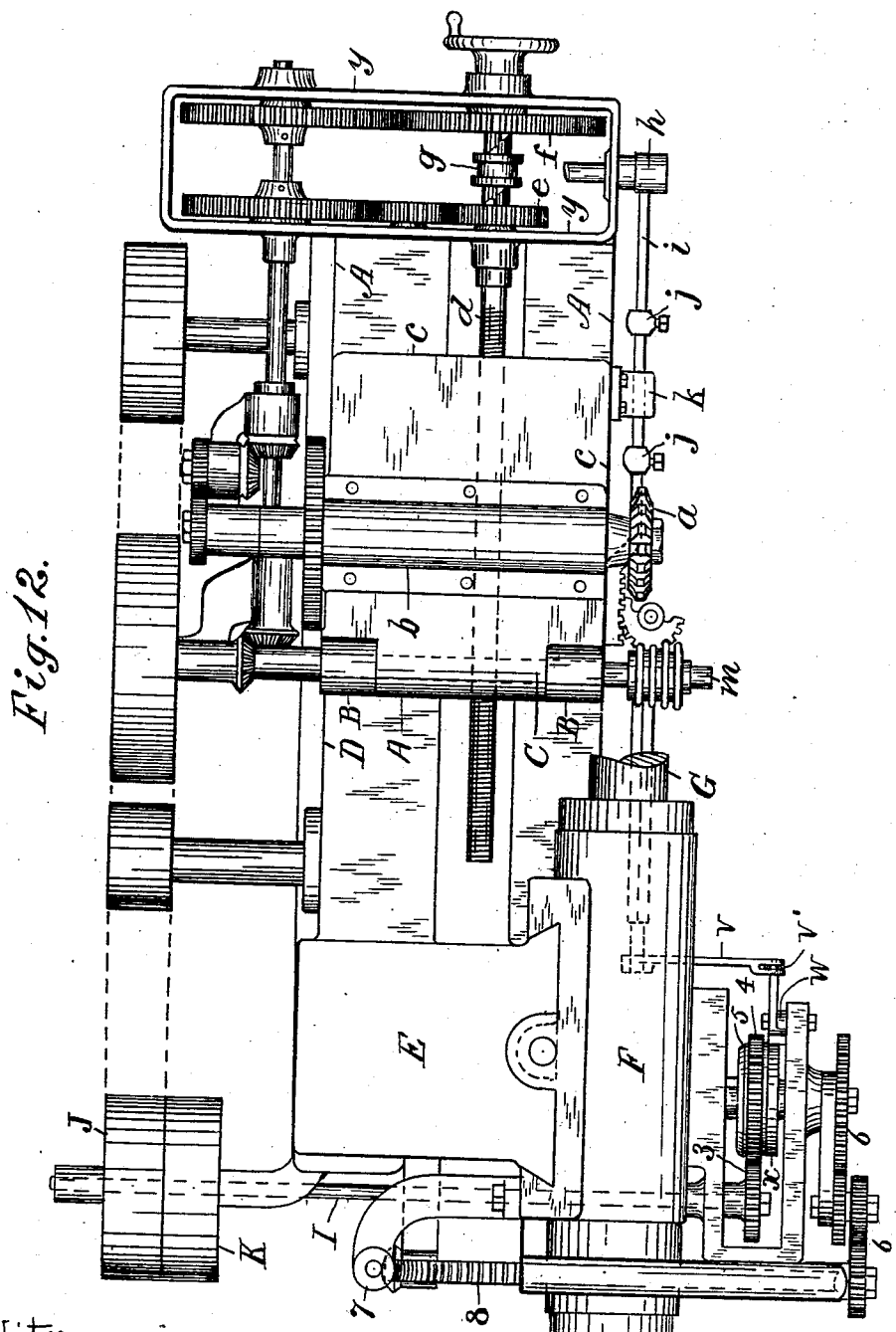

UNITED STATES PATENT OFFICE.

ELMER G. EBERHARDT, OF NEWARK, NEW JERSEY, ASSIGNOR, BY MESNE ASSIGNMENTS, TO NEWARK GEAR CUTTING MACHINE COMPANY, OF NEWARK, NEW JERSEY, A CORPORATION OF NEW JERSEY.

MECHANICAL MOVEMENT.

969,352.  Specification of Letters Patent.  Patented Sept. 6, 1910.

Application filed February 17, 1908. Serial No. 416,220.

*To all whom it may concern:*

Be it known that I, ELMER G. EBERHARDT, a citizen of the United States, residing at 113 Orchard street, Newark, county of Essex, and State of New Jersey, have invented certain new and useful Improvements in Mechanical Movements, fully described and represented in the following specification and the accompanying drawings, forming a part of the same.

This invention relates to a mechanical movement for transmitting an intermittent reversible movement between jointed members, and the object of the invention is to furnish such a construction that the motion of a reversible part upon one of such members may be transmitted to a reversible part upon the other member in different angular relations of the members. This is accomplished in the present invention by disposing parts of the reversible mechanisms upon the two members adjacent to the axis of the joint between the members, and providing each of these reversible parts with a limb movable in the direction of the said axis, whereby these limbs can be engaged or connected together and retain their engagement in different adjustments of the members about the axis.

One form of the invention consists of an annularly toothed spool movable lengthwise upon a stud concentric with the joint of the members, and reversible arms upon the two members with toothed segments to engage the said spool. By this construction the oscillation of one of the arms or segments slides the spool upon the stud, and operates to correspondingly oscillate the other arm or segment and the reversible movement of any mechanism upon one of the members can thus be transmitted to a part or piece upon the other member. As the movement of such a spool is limited, the device is not adapted to transmit continuous movement in one direction but only a reciprocating, oscillating, or other reversible movement.

Other constructions are shown herein to embody the same principle.

The invention is susceptible of many applications, and is shown herein in connection with the cutter-carriage of a gear-cutting machine, for transmitting the reciprocating motion of the carriage at intervals to the latch which controls the indexing mechanism.

As the gear-cutter forms no part of the invention only a few parts are shown diagrammatically.

Figure 11:
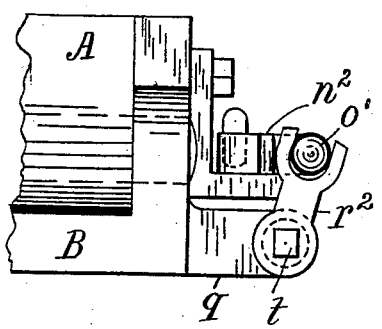
Figure 9:
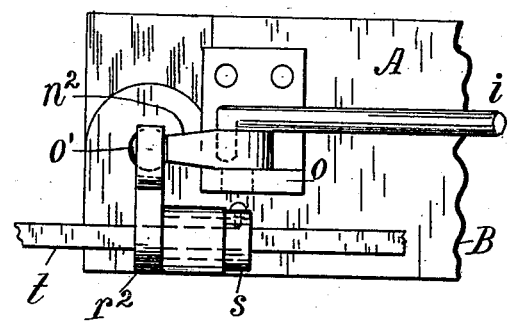
Figure 10:
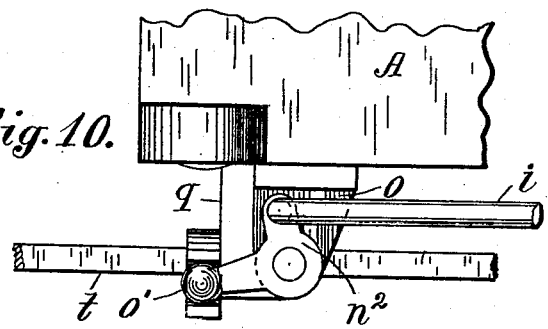

In the drawing, Figure 1 is a side elevation of part of a gear-cutter provided with my invention; Fig. 2 is an elevation upon a larger scale than Fig. 1 of the essential parts of the mechanical movement; Fig. 3 is a plan of certain of such parts; and Fig. 4 is an end view of the parts shown in Fig. 2. Figs. 5 to 8 show an alternative construction, Fig. 5 being an elevation similar to Fig. 2; Fig. 6 is a plan similar to Fig. 3; Fig. 7 is an end view similar to Fig. 4; and Fig. 8 shows the under side of the spool. Figs. 9 to 11 show another alternative construction; Fig. 9 being an elevation similar to Fig. 5; Fig. 10 a plan similar to Fig. 6; and Fig. 11 an end view similar to Fig. 7. Fig. 12 is a plan of a gear-cutter provided with the invention. In Figs. 2 to 11, the parts are shown in proportions different from those in Figs. 1 and 12, to illustrate the invention clearly.

A rotary cutter $a$ is shown mounted in bearings $b$ upon a cutter-carriage $c$ fitted to slide longitudinally upon a bed which is formed of two pieces A and B jointed together upon an axis C, so that the upper bed-piece can be set in various angular positions to cut bevel-gears.

D designates the base of the machine and E the column upon which the bearing F is mounted to carry the indexing spindle G for supporting the gear-blank H during the cutting of its teeth. The bed-piece B of the jointed bed is movable longitudinally upon the top of the base D to bring the cutter $a$ into a convenient relation to the gear-blank H, and has a screw B′ to shift it for setting the cutter in the right relation to the gear-blank.

The bed-piece $a$ is moved and held at any desired angle, by a toothed sector A′ actuated by a worm A² which is carried in bearing $a'$ attached to the bed-piece B and is moved by a hand-shaft B².

The sector is not shown in Fig. 12, as it lies under the center of the screw $d$ and is concealed thereby.

A screw $d$ is shown to reciprocate the cutter-carriage c, and gears e and f are shown mounted to turn upon the screw and are in practice rotated continuously in opposite directions. A sliding clutch-block g is splined upon the screw and moved by a lever h (having a fulcrum at its upper end upon the gear-box y) to engage the larger gear f when feeding the cutter forward, or the small gear e for retracting the carriage at a higher speed.

A rod i is shown coupled to the end of the lever h and furnished with dogs j which are actuated alternately by a tappet k upon the carriage c near opposite ends of the carriage movement.

The parts so far described are common in gear-cutting machines and the forward movement of the rod i is commonly utilized to actuate the latch of the indexing mechanism by connection thereto with an adjustable chain, it being necessary to shorten and lengthen the chain as the bed-piece B is adjusted upon the base D to and from the column E. Such a shortening or lengthening of the connection is avoided by the present invention, as the invention operates through the axis C of the jointed parts A and B.

In Figs. 1 to 4, an annularly toothed spool l is shown mounted upon a stud m supported at the axis of the joint C at the edges of the members A and B, and slidable upon such stud. An oscillating arm n carrying a toothed segment n' is mounted to rock in a bearing o upon the member A, its teeth meshing with the teeth upon the spool; and the rod i is formed with teeth p also meshing with the segment so that the reciprocation of the rod slides the spool longitudinally upon the stud. An oscillating arm r is mounted in a bearing q fixed upon the bed-piece B and has a toothed segment r' meshing with the spool l. The arm has a hub extended through the bearing and secured therein by a collar s, and such hub is shown perforated with a square bore. A square bar t is shown fitted through the said bore and provided with a journal near one end fitted to turn in a bearing u upon the column E. A round splined shaft may be used instead of a polygonal bar, this part in either case forming a rock-shaft, the end of which is provided with a crank-arm v.

When the bed-piece B is adjustable upon the top of the base D, the arm r slides upon the bar t and thus maintains connection therewith in any adjusted position. As the segments n' and r' both mesh with the spool l, the rocking of either oscillating arm slides the spool upon its stud m and produces a corresponding rocking of the other segment-arm. The motion is transmitted in any angular position or elevation of the bed-piece A, as the spool is set on the axis of the joint, and the teeth of the segment n' thus mesh equally with the annular teeth upon the spool in any position of the bed-piece. The contact of the tappet k with the collars j upon the rod i operates to shift the clutch-block g to alternately advance and retract the carriage intermediate to the spacing movements of the gear-blank, so that a fresh tooth is cut in the blank each time the cutter-carriage is advanced; and the motion of the reciprocating-rod i is utilized by means of my improvement to actuate the latch of the indexing mechanism, which is effected by connecting the latch-trip w with the oscillating-arm v by means of a link v'.

The latch w' is shown with a tooth engaging a notch in the stop-disk x which, with the train of gearing 6 employed for spacing the indexing-spindle G, is commonly connected with a friction-driver 4 which tends to propel the gearing 6 continuously, the motion being indicated by the arrow x' in Fig. 1, but said bearing is held stationary as well as the indexing mechanism during the cutting of each tooth by the action of the latch upon the stop-disk.

A driving-shaft I has two pulleys J and K secured upon it, the pulley K to receive a power belt and the pulley J to transmit the motion by a belt L to the various parts of the machine; idlers M being provided to guide and tighten the belt. A gear 3 upon the driving-shaft I rotates a gear 4 continuously between a friction-plate 5 and the notched disk x. The friction-driver 4 runs continuously and drives the notched-disk and the train of change-wheel gearing 6 and thus operates the worm 7 of the indexing-wheel 8 when the latch w' is retracted.

It will be seen that the rod i has a reversible longitudinal movement, while the bar t has a reversible rotary or oscillating movement, and that the spool l forms a connector between the rod and bar in any angular position of the bed-piece A.

The toothed segments r' and n' are, in effect, arms mounted upon the pivots of their bearings and the teeth serving as means of engagement with the connector spool; but other means of engaging the oscillating arms with one another are shown in the modifications which will be hereinafter described, the essential feature being the mounting of oscillating arms upon each of the members and transmitting the motion from one to the other by means located on a line with the axis of the joint.

It will be noticed that the mechanical movement is so constructed as to convert the reciprocating motion of the rod i into an oscillating motion of the bar t, as the bar is better adapted to convey the motion to the latch-trip by operating with an oscillating movement. Such variations in the movements of the parts is effected merely by the relation of the segment-arms to the rod i and bar t with which they are respectively connected. The rod $i$ reciprocates in its connection with the segment $n'$, because it stands transverse to the axis of the segment, while the bar $t$ oscillates because it stands parallel to the axis of the segment $r'$ and oscillates therewith, which arrangement permits the sliding adjustment of the bed-piece B upon the base D while maintaining connection of the bar $t$ and its segment $r'$. Such sliding adjustment is entirely automatic and makes an automatic connection of the latch-trip $w$ with the reciprocating bar $t$ in all positions of the bed B on the base D. Both the rod and bar may be connected with the oscillating arms so as to oscillate, or both may be connected so as to reciprocate, as the essential part of the invention is a connection between the two oscillating arms which will permit their bearings to be turned into different angular relations to one another.

Figs. 5 to 8 inclusive show a modification in which both the oscillating arms are connected with reciprocating parts, and only one of them has a toothed connection with the spool to permit the turning of the bearing around the spool's axis. In these figures, the rod $i$ is shown connected by a pin $i'$ with one side of the arm $n$, so as to oscillate the arm and its segment when the rod reciprocates. The spool is shown with a slot $l'$ in its under side and the arm $r^2$ has its end projected into the slot and engaging the ends of the slot so as to rock when the spool slides upon its stud. The engagement of the arm $r^2$ with the spool prevents the spool from rotating, but the segment $n'$, when its bearing is turned into different angular relations with the bearing $q$, maintains engagement with the spool by the connection of its teeth with the teeth upon the spool. An arm or crank $t'$ is shown attached to the arm $r^2$ and a connecting-bar $u'$ is shown pivoted to the arm $t'$, so that the rod $i$ and bar both receive reciprocating movements from their connected segments.

In the modifications shown in Figs. 9 to 11 inclusive neither a toothed segment nor a toothed spool is employed, but an oscillating arm $n^2$ upon the bed-piece A is terminated in a ball $o'$ in line with the axis of the joint, and an arm $r^3$ is journaled upon the bed-piece B and provided with a fork at its upper end to embrace the sides of the ball. The rock-shaft $t$ is extended through the hub of the arm $r^2$ and is rocked thereby as with the arm $r$ in Fig. 1. The oscillating arm $n^2$ thus conveys motion directly to the oscillating arm $r^2$ and rock-shaft $t$, and the oscillating arms retain engagement with one another in different adjustments of the bed-piece A, as the ball $o'$ upon the arm $n^2$ is in line with the axis of the joint and does not change its relation to the fork of the arm $r^2$.

In all of the modifications shown and described herein, the two jointed members are hinged together like the covers of a book and project in the same direction from the joint when closed together, and are adapted to be opened out from one another like the leaves of a book, and the mechanism provided not only conveys the motion from one of the members to the other in any angular adjustment of the members, but permits both the members bodily to be moved longitudinally in relation to the oscillating bar. This longitudinal movement is effected, in the construction shown, by the adjustment of the member B upon the base D on which the oscillating bar $t$ is journaled, such movement of the member upon the base being effected by the screw $B'$.

In all of the modifications described there is a reciprocating rod mounted upon one of the jointed members, an oscillating rod mounted upon the other member and movable longitudinally in relation to the joint of the members, and engaging limbs projected from such parts to the axis of the joint and movable in the direction of the said axis, so that these limbs may maintain engagement with one another in various angular adjustments of the members.

I disclaim the use of mere bevel gearing for connecting two jointed members at their axis, and also the use of a worm and worm-wheel to connect jointed members at their axis; as such uses are common.

My invention is distinguished from these by the relation of the members to one another and the conversion of the reciprocating motion originating upon one member into an oscillating motion transmitted to a rod upon the other member.

Having thus set forth the nature of the invention what is claimed herein is:

1. The combination, with two members A and B jointed at one end and projected from the joint in the same direction when closed together, of means for transmitting reversible movement between the said members, consisting of a reciprocating rod carried upon one of the members, an oscillating rod carried upon the other member and such rod and the joint of the members movable longitudinally in relation to one another, and limbs engaged with one another and connected with the said rods and extended to the axis of the joint and movable in the direction of the said axis, whereby the reciprocating motion of one rod is converted into an oscillating motion of the other rod in different jointed positions of the members.

2. The combination, with two members A and B jointed at one end and projected from the joint in the same direction when closed together, and adapted to be opened out from one another like the leaves of a book, of means for transmitting reversible movement between the said members consisting of a stud concentric with the joint of the members, a toothed spool slidable thereon, bearings mounted upon the members adjacent to the joint, segments pivoted upon the bearings to oscillate in line with the stud and having teeth engaged with the spool, a reciprocating rod upon one of the members for oscillating the segment thereon and a rod actuated by the segment upon the other member and adjustable longitudinally in relation to the joint of the members.

3. The combination, with two members A and B jointed at one end, of a stud projected from the joint at the edges of the members, a toothed spool slidable upon the stud, and arms having segments engaged with the spool and mounted respectively upon the two members to turn in planes longitudinal to one member and transverse to the other member, a reciprocating rod connected with the segment upon one of the members, and a bar fitted movably to the other segment to be oscillated thereby.

4. The means for transmitting movement between jointed members, consisting of the jointed members, a stud concentric with the joint of the members, a toothed spool slidable thereon, bearings mounted upon the members adjacent to the joint, segments pivoted upon the bearings to oscillate in line with the stud and having teeth engaged with the spool, means upon one of the members for oscillating the segment thereon and means actuated by the segment upon the other member for conveying the said movement to the desired point.

5. The means for transmitting movement between jointed members, consisting of the jointed members, a stud concentric with the joint of the members, a toothed spool slidable thereon, bearings mounted upon the members adjacent to the joint, a segment mounted in one of the said bearings and meshing with the spool, a rack-bar engaging the teeth of such segment for oscillating the same and reciprocating the spool, a segment pivoted in the bearing upon the other member and engaging the spool and oscillated thereby, and having a bar movable through its hub and turned thereby, and a device actuated by such oscillating bar, whereby the actuation of said device may be maintained when the said segment and hub are adjusted longitudinally upon said bar.

6. The combination, with two members A and B jointed at one end, of a stud projected from the joint at the edges of the members, a toothed spool slidable upon the stud, a segment mounted to turn upon the member B and engaged with the spool, mechanism actuated by such segment, a toothed segment mounted upon the member A adjacent to the stud and meshing with the spool, a longitudinally movable rod engaged with such segment to rock the same, and means movable upon the member A for reciprocating such rod at intervals to oscillate the segment upon the member B.

7. The combination, with two members A and B jointed at one end, of a stud projected from the joint at the edges of the members, a toothed spool slidable upon the stud, a bearing having its axis parallel with the member B, a segment meshing with the spool and journaled in the bearing and having a bar slidable through the hub of such segment and turned thereby, connections at one end of the bar for transmitting motion to any device, means to hold the bar from longitudinal movement, means for adjusting the member B with the segment longitudinally upon such bar, a bearing upon the member A with toothed segment mounted thereon meshing with the spool, a toothed rod meshing with the segment on the member A and extended longitudinally of said member, and means upon the member A for reciprocating such rod, to rock the attached segment and oscillate the bar upon the other member with any device attached thereto.

8. In a gear-cutter the combination, with the base, of the bed consisting of two members jointed together and the lower member adjustable upon the base, a cutter-carriage movable longitudinally upon the upper bed-piece, means for adjusting the upper bed-piece at different angles upon the lower bed-piece, a rod reciprocated upon the upper bed-piece by the cutter-carriage, an arm oscillated by such rod adjacent to the joint of the members, an arm journaled upon the lower bed-piece adjacent to the joint of the members, a connection of the two oscillating arms arranged and operated in a line with the axis of the joint to oscillate the lower arm coincident with the upper arm, a bar extended parallel with the base through the lower oscillating arm, connections at one end of the bar for transmitting motion to the latch of the indexing mechanism, and means to hold the bar from longitudinal movement whereby the motion of the rod upon the upper member is transmitted to the latch in any adjusted position of the upper or lower bed-piece.

In testimony whereof I have hereunto set my hand in the presence of two subscribing witnesses.

ELMER G. EBERHARDT.

Witnesses:
CHAS. B. DUNCAN,
FRANK E. EBERHARDT.